US012199964B1

(12) United States Patent
Tougas et al.

(10) Patent No.: US 12,199,964 B1
(45) Date of Patent: Jan. 14, 2025

(54) TIC DETECTION-BASED VIDEO AUTHENTICATION METHOD AND SYSTEM

(71) Applicant: UIPCO, LLC, San Antonio, TX (US)

(72) Inventors: Brian Tougas, Spring Branch, TX (US); William Daniel Farmer, Carrollton, TX (US); Ruthie D. Lyle, Durham, NC (US); Kelly Q. Baker, San Antonio, TX (US); Ryan Thomas Russell, The Colony, TX (US); Noe Alberto Martinez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 244 days.

(21) Appl. No.: 17/514,458

(22) Filed: Oct. 29, 2021

(51) Int. Cl.
  *H04L 9/40* (2022.01)
  *G06V 40/16* (2022.01)
  *G06V 40/20* (2022.01)

(52) U.S. Cl.
  CPC ............ *H04L 63/08* (2013.01); *G06V 40/176* (2022.01); *G06V 40/20* (2022.01)

(58) Field of Classification Search
  CPC ....... H04L 63/08; G06V 40/176; G06V 40/20
  USPC .......................................................... 726/4
  See application file for complete search history.

(56) References Cited

U.S. PATENT DOCUMENTS

| | | | | |
|---|---|---|---|---|
| 7,421,097 | B2* | 9/2008 | Hamza | G06V 40/172 235/382 |
| 10,402,553 | B1* | 9/2019 | Johnson | G06V 40/20 |
| 10,482,451 | B2* | 11/2019 | Buckman | H04W 76/14 |
| 10,601,821 | B2* | 3/2020 | Du | G06V 40/176 |
| 11,188,637 | B1* | 11/2021 | Lawson | G06F 21/44 |
| 11,288,530 | B1* | 3/2022 | Genner | G06F 21/32 |
| 2016/0012411 | A1* | 1/2016 | Kursun | G07F 19/205 705/42 |
| 2018/0213206 | A1* | 7/2018 | Price | H04N 13/254 |
| 2019/0197224 | A1* | 6/2019 | Smits | G06V 40/176 |
| 2020/0327755 | A1* | 10/2020 | Burris | G07C 9/257 |
| 2020/0334347 | A1* | 10/2020 | Hoyos | H04L 63/0861 |
| 2020/0410076 | A1* | 12/2020 | Tussy | G06Q 20/02 |
| 2022/0417234 | A1* | 12/2022 | Schropfer | H04L 63/0861 |
| 2023/0177128 | A1* | 6/2023 | Vankipuram | G06F 3/011 713/186 |

FOREIGN PATENT DOCUMENTS

CN 214906937 U * 11/2021

* cited by examiner

*Primary Examiner* — Philip J Chea
*Assistant Examiner* — Ghizlane Maazouz
(74) *Attorney, Agent, or Firm* — Plumsea Law Group, LLC

(57) ABSTRACT

A user specific tic behavior detection-based method and system of performing an authentication of video of a person in order to authorize access to a secured resource. The user provides audio and/or video data in which they exhibit one or more tic behaviors. When a person later requests access to the user's account, the system and method are configured to capture a video and/or audio recording of the person requesting access. The data is evaluated to determine whether the previously detected tic behavior is present. If the tic behavior is present, the system determines the image or voice is authentic and can verify an identity of the person. In some cases, the system can further be configured to automatically grant the person access to one or more services, features, or information for which he or she is authorized.

20 Claims, 10 Drawing Sheets

TIC DETECTION-BASED VIDEO AUTHENTICATION METHOD AND SYSTEM

TECHNICAL FIELD

The present disclosure generally relates to identity authentication, and specifically to a method and system for authentication of videos of persons seeking access to one or more secured services, features, and resources. The authentication is based on detection of a specific type or pattern of tics produced by a user using image and/or audio data captured by the user's computing device.

BACKGROUND

Organizations may provide authorized end-users with various secured services or resources via multiple communication channels. Examples of such channels include modes of communication (e.g., a communications network) for exchanging data between devices, where such devices may include, but are not limited to, computing devices, such as tablets, personal computers, and smartphones; point of sale devices; ATMs; connected smart devices, such as refrigerators, watches, and laptops; telephones, such as landline telephones or mobile phones; electronically locked spaces managed by computer user interfaces, such as safe deposit box chambers, lockers, cars, offices, homes; and face-to-face contacts, such as interaction between a user and an employee of the organization. Channels may also include software and firmware associated with the devices and communications devices, such as web portals, applications, networks, mobile applications, and instant messaging systems. Channels may also include hardware associated with the computing devices and telephones, such as the network hardware, credit card scanners, and retinal scanners.

In most scenarios in which an end-user attempts to access a secured resource via one or more of these channels, the end-user will be required to provide some proof of identity, typically associated with an identification card, key-card, fingerprint, or other factor before access is granted. Personal computers (computing devices) pose additional complexities in authenticating users. Computing devices are commonly used by more than one person. It is generally not safe to assume that the identity of the computing device satisfies the ownership factor. Additionally, computing devices have been more easily compromised than other devices. Current solutions increase security, but are often inconvenient for users. More recently, the threat of video forgery (e.g., deep fakes) have increased concern that image data of an end-user may not be authentic.

Thus, authentication (i.e., identifying and verifying) of an end-user can be time-consuming for both the end-user and the organization, as well as burdensome for users who are required to carry and present the necessary identification credentials and/or keys, or memorization of passwords or codes. It may be appreciated that many businesses and other organizations would benefit from mechanisms by which to reduce the costs associated with the authentication and authorization of customers. Furthermore, customers will be attracted by an authentication system that reduces or even eliminates the need to carry or remember multiple unique identification factors, as well as a system that significantly improves account security.

There is a need in the art for a system and method that addresses the shortcomings discussed above.

SUMMARY

In one aspect, a method of verifying an authenticity of video in order to protect user resources is disclosed. The method includes a first step of receiving, at a cloud-based authentication system and from a first computing device, a request to access a secured resource of a first user, and a second step of receiving at a first time, at the authentication system, first image data captured by a camera of the first computing device, where the first image data include a video recording of a face of a person. A third step includes accessing a first reference pattern stored as a record linked to a first user identity in a database, and a fourth step includes determining, at the authentication system, that the first image data includes a tic behavior that is sufficiently similar to the reference pattern so as to be classified as a match. Furthermore, the method includes a fifth step of verifying, in response to the tic behavior matching the reference pattern, an authenticity of the video, and a sixth step of granting the first user access to the secured resource for which the first user is authorized.

In another aspect, a method of verifying an authenticity of a voice in order to protect user resources is disclosed. The method includes a first step of receiving, at a cloud-based authentication system and from a first computing device, a request to access a secured resource of a first user, and a second step of receiving at a first time, at the authentication system, first audio data captured by a microphone of the first computing device, the first audio data including a voice recording of a person. A third step involves accessing a reference pattern stored as a record linked to a first user identity in a database, and a fourth step includes determining, at the authentication system, that the first audio data includes a tic behavior that is sufficiently similar to the reference pattern so as to be classified as a match. In addition, a fifth step includes verifying, in response to the tic behavior matching the reference pattern, an authenticity of the voice as belonging to the first user, and a sixth step includes granting the first user access to the secured resource for which the first user is authorized.

In another aspect, a system for verifying an authenticity of video in order to protect user resources includes a processor and machine-readable media. The machine-readable media include instructions which, when executed by the processor, cause the processor to receive, at a cloud-based authentication system and from a first computing device, a request to access a secured resource of a first user, and to receive at a first time, at the authentication system, first image data captured by a camera of the first computing device, the first image data including a video recording of a face of a person. In addition, the instructions further cause the processor to access a first reference pattern stored as a record linked to a first user identity in a database and to determine, at the authentication system, that the first image data includes a tic behavior that is sufficiently similar to the reference pattern so as to be classified as a match. Furthermore, the instructions cause the processor to verify, in response to the tic behavior matching the reference pattern, an authenticity of the video, and grant the first user access to the secured resource for which the first user is authorized.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
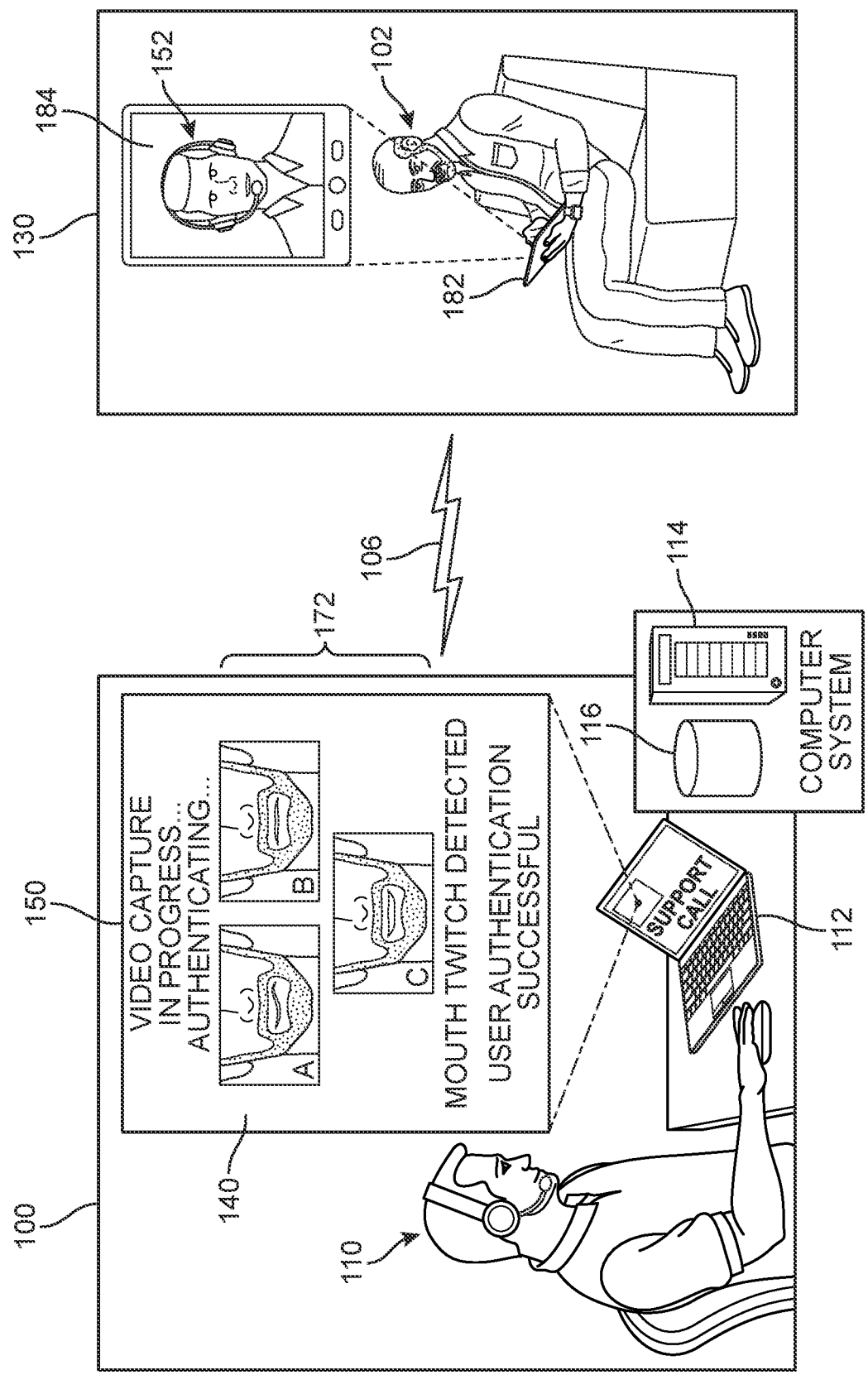
FIG. 1 is an overview of a scenario in which a person exhibiting a tic behavior provides image data during a communication session in order to obtain access to a secured resource, according to an embodiment.

The embodiments provide a method and system of authenticating user videos and other streaming image and/or audio data in a more secure and more efficient manner by detection of specific behavior by the user in the data. As described in greater detail below, an authentication process and system based on a user's unconscious and repetitive behaviors may be utilized for reducing and in some cases eliminating the need for users to present credentials, input passwords, or otherwise offer identity tokens or factors, as well as curtail the use of video forgery to fraudulently access secured resources such as a user's private account. The proposed system takes advantage of an increasing reliance on teleconferencing and the growing availability of image sensors with computing devices in the day-to-day life of the modern consumer.

More specifically, the system contemplates the capture of video and/or audio during communication sessions with a user. This can occur, for example, during a video session with a customer representative. Image and/or sound data of the user face is recorded, stored, and used as training data for future authentication sessions. In some cases, the representative may initiate the recording of the data from the user's device. In other cases, the system could be configured to monitor the position and orientation of the user's face in the video feed. When their face is in an appropriate position and orientation, the system could send a signal to have image data captured for use by the system, either as training data or for detection of the expected tics. For users with motor tic disorders, the user's body language—in particular, their face and head-will regularly present in a way that corresponds to the tics. This behavior could be automatically detected within the video. These movements of the member's expression or body, or even sounds, could then be detected by the authentication system to indicate that this is not a faked video.

In different embodiments, such an approach can be advantageous in combating the growing threat of video forgery. Deep fake algorithms in particular are becoming increasingly sophisticated. By generating a face through a deep learning neural network, such algorithms are able to replace a real face with an imposter fake face in real time. Such algorithms can be implemented using both Artificial Intelligence (AI) and Machine Learning (ML) to 'trick' a secured system into releasing confidential information. While existing technologies allow digital watermarks to be added to images, videos, and audio files or streams to ensure the authenticity of distributed media, the use of such technologies is typically controlled by producers of the media rather than by a speaker within a video. As will be discussed below, the proposed systems can further be configured to verify a user's identity with minimal user effort and offer a simplified, efficient, and ultimately highly convenient process by which to authorize and grant the user access to secured resources. Such systems can rely on device infrastructure that is already in place for video and image recording, making it simple to deploy at a low cost.

For purposes of this application, tics and individuals with tic disorders exhibit sudden, stereotyped movements or produce sounds that are typically performed secondary to irresistible urges. Tics can appear as sudden, rapid, purposeless motor movements or sounds that involve discrete muscle groups. They are also stereotyped in that they will occur in a similar manner each time they are performed. Almost any movement, sound, or combination therein that the body can make can become a tic. Although some tics are milder (i.e., eye blinking, head/nose tilt), others can be more severe to the point of causing pain to the patient (i.e., head or neck jerk). According to DSM-IV-TR (American Psychiatric Association, 2000), tic disorders are characterized by brief, stereotypical, but nonrhythmic movements and vocalizations called tics. Common tics include eye blinking, grimacing, jaw, neck, shoulder or limb movements, sniffing, grunting, chirping, or throat clearing. The disorders tend to co-occur with other psychiatric conditions such as ADD/ADHD, trauma, PTSD, anxiety, learning disabilities, OCD, and mood disorders. In some cases, those with military experience are more likely to be exposed to trauma that can trigger tic behaviors, and so organizations that more directly serve the military community can benefit from the proposed authentication approach.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. In addition, the term authentication refers to the process of proving (or verifying) an identity or source of identity, and typically occurs when subjects provide appropriate credentials to prove their identity. For example, when a user provides the correct password with a username, the password proves that the user is the owner of the username. Thus, the authentication provides proof of a claimed identity. In the embodiments described herein, authentication of an image based on the detection of a specific output in the image can be used to prove the user is the owner of the username. As a general matter, three main methods of authentication include (a) user knowledge, such as a password or PIN; (b) user possession, typically provided by the secured system, such as a key, smart card, CAC (Common Access Card), PIV card (Personal Identity Verification card), RSA, or other card or token, magnetic stripe cards, certificates with a digital signature, computing device that is configured to receive a control signal, etc.; and (c) biometric factors, such as voice recognition, facial recognition, retinal and fingerprint scans, etc. It should be appreciated that the proposed embodiments may be used as a layer of security in addition to conventional methods such as the three categories described above (e.g., in addition to passwords, pins, ID card, biometric factors, etc.).

Authorization refers to the concept of allowing access to resources only to those permitted to use them. In other words, authorization is a process that protects resources by only allowing access by consumers that have been granted authority to use or receive them. Some examples of such resources include individual files or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The term "passive" refers to the concept of a system and method that is not dependent on any particular 'active' interaction of a person with a device resulting from a change in the person's normal activity or behavior and/or do not require the user to remember anything. In other words, walking and moving their body from one location to another, as well as more fine motor movements (e.g., adjusting the position of their arm or a change in facial expression) are passive interactions, as the person could perform these activities regardless of the authentication system that is in place. However, other user actions, such as but not limited to providing a passcode, pre-registered security question answers, etc. are active inputs and a system requiring any of these types of information would not be considered passive. In addition, this type of arrangement-relying on a change in expression of the user or indicating which speaker produced a sound-precludes the need to previously record and store any biometric data (e.g., retinal scan, fingerprint scan, voiceprint, etc.) for the user, which some users are uncomfortable doing.

Organizations and businesses often provide support to customers by making available to their customers one or more member service representatives (MSRs) or other customer representatives and service agents (referred to generally herein as "agents") who have access to networked computers, telephones, often networked to a larger corporate computer network, including mainframes, microcomputers and LANs. For example, voice and data pathways into the center can be linked through routing servers and computer telephony integration (CTI). In some cases, CTI also facilitates interfaces with customer support servers in addition to any e-mail system, databases and web-based services. A customer may contact or be contacted by an MSR to learn more about a service or product, obtain guidance, or purchase various items. Implementations of the proposed systems and methods may also include interactions with an agent, virtual or human, of a secured system. This service representative or agent is stationed at a location that is remote relative to the customer's location, such as a call center. As used herein, the term "customer" or "user" should be understood to refer to any end-user or person requesting or receiving assistance or other communications from a secured system, including via a communication session with a remote agent, whether human or virtual/artificial. The customer can typically view at least one aspect of the interaction through a display of their computing device.

It may be appreciated that conventional methods of authentication rely heavily on identification documents or other tangible items provided by the system administrators that users are required to carry on their person and present when prompted, and/or intangible factors such as memorized passcodes or security questions and answers. However, such tokens have significant shortcomings. For example, they can be lost, stolen, or forged. In many cases, an individual may need to carry multiple identification cards or tokens, which may be unwieldy. Furthermore, less tangible factors can be burdensome, requiring memorization or physical contact or a particular physical position or proximity with a device. The following systems describe a process of authentication that does not rely on such factors, and serves as a barrier to deep fake imposter attacks.

For purposes of introduction, an overview of one embodiment of the proposed systems and methods is illustrated with reference to FIG. 1. In FIG. 1, an example of an authentication process is shown in which a first user 102, in a first location 130, is on a call with a representative ("first agent") 110 who is at a call center 100, or otherwise in a remote location relative to the first user 102. The first user 102 is conversing with first agent 110 in order to be authenticated and then obtain access to their account or other secured resource. In different embodiments, first user 102 can participate in the communication session via a telephone or a computing device configured with a network connection and connected to a camera or other image sensor, depending on the mechanism utilized for data transmission.

In some embodiments, first user 102 may have access to a user computing device ("first device") 182 through which the communication session occurs. The user device can include a tablet, a laptop, a smartphone, a desktop computer, a smart device, or similar kind of device that allows user 102 to contact call center 100. For example, the first user 102 can be speaking and listening to the first agent 110 via a desktop computer. For purposes of this example, the first customer 102 has just been connected to first agent 110 and is seeking access to their account details via a tablet device.

In different embodiments, the first device 182 can include an electronics unit comprising a plurality of different components, such as one or more of various user interface components (e.g., a touchscreen display, keyboard, mouse, microphone, camera, speaker, etc.), a user interface module, a processor, and/or a communication module. These devices may include a system including one or more processors and memory. Memory may comprise a non-transitory computer readable medium. Instructions stored within memory may be executed by the one or more processors. The first device 182 may be configured to receive and analyze data from various input sensors associated the device or data that is communicated from external components or devices to the device. In some cases, the first device 182 may also include a navigation system equipped with a GPS receiver that can receive GPS information or other receivers capable of receiving global or local positioning information.

A communication module may allow the first device 182 to communicate wirelessly. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In different embodiments, the first device 182 may include a device display ("display") 184 that can, for example, present information and various media for a product/service support software application ("app"). In some embodiments, the app is associated with the provider of the product/service for which the service representative is offering support. In some embodiments, the first user 102 can receive and send information through a user interface that may be presented on a display for the device. In some embodiments, the display may be a touchscreen, allowing the customer to interact with the user interface directly by touch. The user interface may refer to an operating system user interface or the interface of one or more software applications that may run on the first device 182. In some embodiments, the user interface can include a messaging window or other chatspace by which the service representative may send messages or other digital content. Alternatively, in some embodiments, the first user 102 can also speak with the service representative via a voice calling application on first device 182, or directly through a telephone or other external device.

In an example embodiment, customer service call center 100 includes at least one computer system 114. The term "computer system" refers to the computing resources of a single computer, the partial computing resources of a single computer, a plurality of computers communicating with one another, or a network of remote servers. In one embodiment, computer system 114 includes at least one server having at least one processor.

In different embodiments, computer system 114 includes one or more computing devices (for example, a server) that may be in communication with one or more databases 116. Databases could be co-located with computing devices or could be remote databases that are accessible by computing devices over a network. Databases can include any kind of storage devices, including but not limited magnetic, optical, magneto-optical, and/or memory, including volatile memory and non-volatile memory. In an example embodiment, computer system 114 may also include or be configured with access to an access management system (see FIGS. 2A-2C), of which a tic detection verification module ("verification module") is a component. In some embodiments, the verification module may be implemented in software, hardware, or a combination thereof.

In different embodiments, while the first user 102 is communicating with first agent 110, the access management system can be configured to verify an identify of a person so as to either permit or deny access to the user-identity dependent services. As used herein, the term "user" or "member" or "account holder" should be understood to refer to any end-user or person requesting or receiving assistance or other communications from a support agent or service representative. It should be understood that while the following description presents a sequence illustrating the use of the proposed systems and methods in a customer-agent dynamic, in other embodiments, the proposed systems may be utilized by a broad range of end-users, including other types of work calls and corporate calls, or other instances in which access is dependent on video interaction or a detection of video forgery is needed.

As shown in FIG. 1, first agent 110 has access to a representative device ("rep device") 112 connected to computer system, which may be mobile computing device, such as a smartphone or tablet computer, a desktop computer, a laptop computer or any other kind of computing device. Using rep device 112, first agent 110 may be able to review customer records, send documents and forms to a customer, provide access to a secured resource, and/or perform other tasks required to help a customer calling in to call center 100.

In some embodiments, both rep device 112 and first device 182 may be computer systems for processing and communicating information. Each device may generally include a processor, a data storage component, and a display. Each device may also include components to facilitate communication with external systems (for example, hardware and software components to enable communication over a network). In some cases, a device may include one or more input devices, such as a keyboard, mouse, and/or one or more physical buttons integrated into a case of the device. In other cases, a device may further include touchscreen controls and inputs.

In one embodiment, first device 182 could operate in a client-server relationship with one or more servers of computer system 114. For example, computer system 114 may include a server that communicates with first device 182 as well as other remote devices (e.g., user devices of other customers) over a network 106. The first device 182 may provide the front-end of a system that provides users with options for performing various kinds of tasks (for example, making fund transfers when the company is a bank). In some cases, first device 182 may run a client software ("app") 152 through a web browser, in which case the client software may be hosted on a server associated with computer system 114. In other cases, first device 182 may run client software in the form of a native software application that has been downloaded through a centralized marketplace (i.e., an "app store"). In some cases, while the client software that allows users to perform various tasks may be run on the first device 182, the data may be retrieved from and stored on databases associated with computer system 114 (e.g., databases 116).

During the call between first agent 110 and first user 102, the first user 130 requests access to an account or other secured resource of the first user. In response, in different embodiments, the remote access management system can automatically, or at the manual request of the service representative, initiate an authentication procedure, action, or task that includes a remote image and/or audio capture event. As a general matter, a remote capture event refers to the process and period during which the authentication system issues a control signal to a remote user device over a network, and the control signal causes the user device to capture data via sensors connected to the user's device.

In different embodiments, the access management system can then generate one or more control signals that are transmitted over network 106. In FIG. 1, the verification module has generated a control signal that requests or triggers a capture of a sample of image data 140 by a camera of (or connected to) the first device 182. In some other embodiments, the image data 140 is one or more segments taken from a video stream received during the communications session. This captured image data 140 can include an image of the face of the user. The captured image data 140 is then sent to and received by the remote access management system via network 106.

Based on the received image data 140, the system will determine whether to authenticate the user for access to the secured resource. For example, a verification module 150 can process and analyze image data 140 and determine whether the image data 140 includes a change in expression of the user that corresponds to the expected reference pattern(s) (based on user enrollment data previously collected) that should occur during interactions with the present user. If the expected involuntary response 172 is detected in the image data 140, the authenticity of the video or image can be verified, providing an additional layer of veracity to the user's identity. In this example, image data 140 does include the correct facial response (corresponding here to a mouth twitch movement sequence A (twitch to the right)→B (mouth returns to neutral)→C (mouth is returned to voluntary control), and the system automatically communicates this information to the service representative. In some embodiments, the duration of the tic or portions thereof can also be used to verify the authenticity of the pattern. Thus, in FIG. 1, without further action or presentation of credentials by first user 102, the communication session can proceed with permitting first user 102 access to the account linked to the authenticated identity of the first user 102. The first user 102 is then able to make account requests and/or receive sensitive account information.

While in some embodiments the system may incorporate additional layers of authentication that may supplement the authentication process, such as voice recognition, fingerprint recognition, password or pin-code verification, or other such factors, it may be appreciated that the system can be readily implemented without such additional steps. In other words, the first user 102 is able to obtain access to the desired secured resources without an identification card, debit card, or other system-provided token typically presented for such occasions. The system thereby allows the user to be passively (i.e., 'touchlessly') authenticated. In some embodiments, the system is further configured to automatically provide the user with access to the secured service linked to the user's unique account, in response to the authentication that is performed based only or primarily on the image data capture of the visual or audio pattern.

Figure 2A:
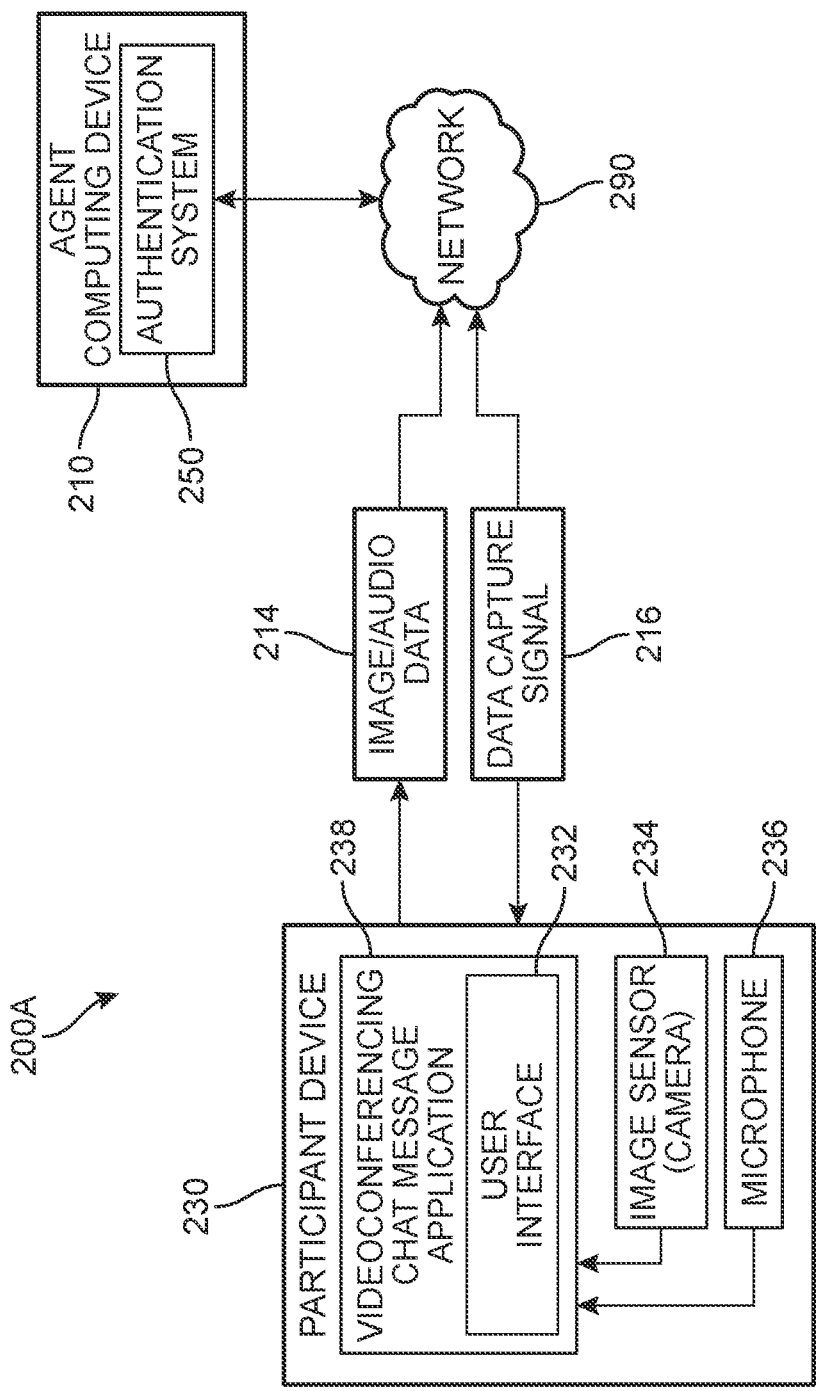
FIGS. 2A-2C are an overview of an environment of a tic behavior detection-based access system, according to an embodiment.
Figure 2B:
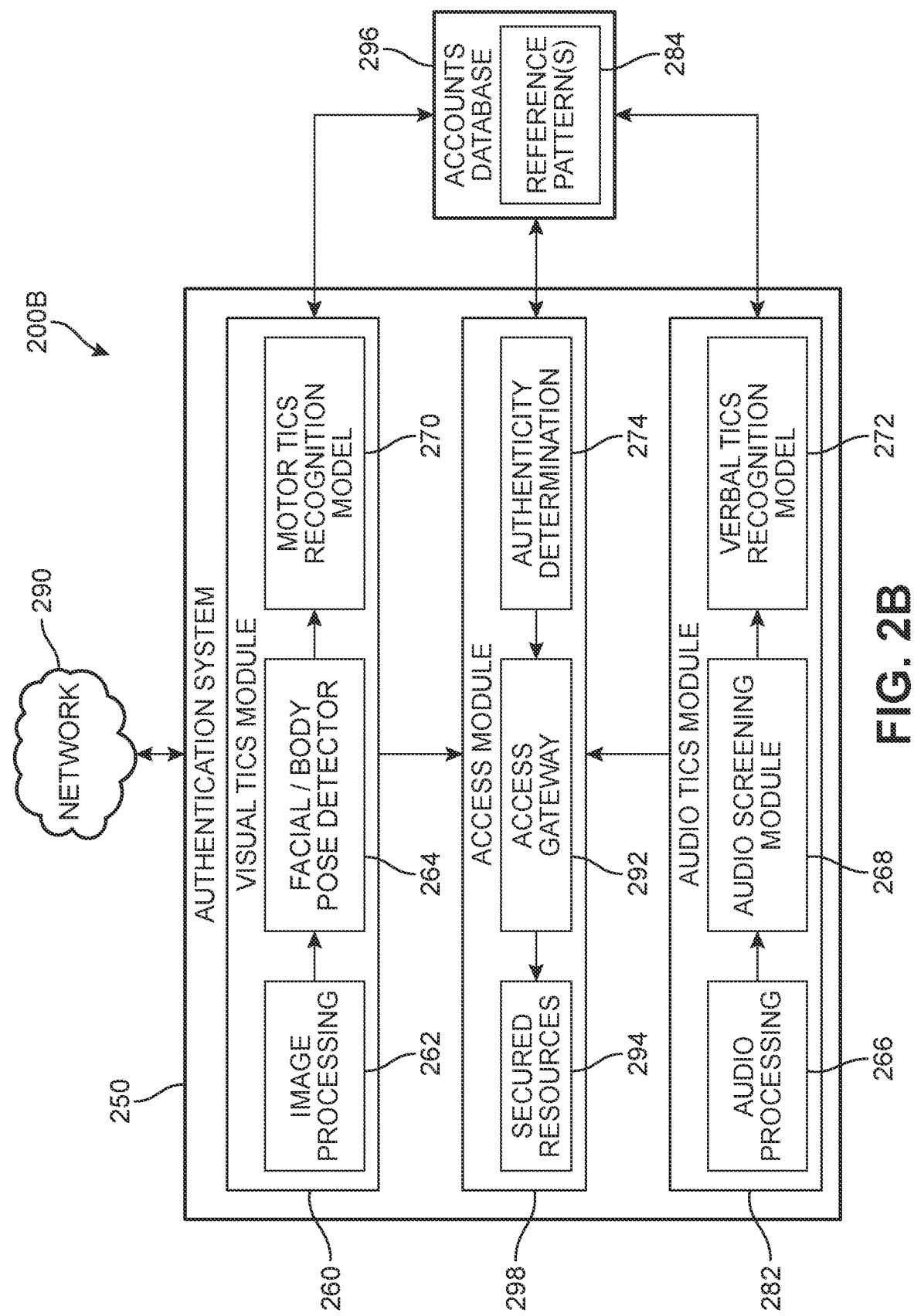

In order to provide the reader with a greater appreciation of the embodiments, FIGS. 2A-2B depict an overview of an embodiment of an environment 200A and 200B of an access management system architecture in which user image and/or audio data is captured and used to determine an authenticity of the video. The two figures are separated for purposes of clarity, such that the two drawings represent a single diagram. It should be understood that the environment (200A, 200B), collectively referred to as environment 200, is presented is for purposes of illustration only, and other embodiments may utilize different or additional components or processes. The environment 200 may alternatively include additional, fewer, or different components. For example, the environment 200 may include additional storage devices, additional servers, additional computing devices, and other features not shown in FIGS. 2A and 2B.

As shown in FIG. 2A, the environment 200 includes a participant computing device ("participant device") 230 that is configured to communicate with an agent computing device ("agent device") 210, for example via a Wi-Fi, cellular, or other network connections 290. The networks 290 may comprise any number of electronic devices and use any number of communication protocols to facilitate data communications within the network 290. One having skill in the art would appreciate that the network 290 may include a variety of internal and/or external networks 290 of various types implementing various data communications technologies. The communication over the network may be performed in accordance with various communication protocols such as Transmission Control Protocol and Internet Protocol (TCP/IP), User Datagram Protocol (UDP), and IEEE communication protocols. The networks 290 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 290 may include a physical and/or logical architecture defined by firewalls, proxy servers, routers, switches, or similar features that implement various levels of security and my function as logical gateways or boundaries. While the various components of environment 200 are shown as being accessed through a cloud network and/or stored on a cloud-based server in FIGS. 2A and 2B, in other embodiments some or all components or modules described herein can reside in participant device 230 and/or agent computing device 210.

In different embodiments, the participant device 230 includes a device display ("display") that can present information and media for a product/service, for example via a videoconferencing-chat messaging or other communication application ("app") 238 that can connect the participant with the support agent. For example, a customer can receive and send information through a user interface 232 for app 238 that may be presented on the device display. Although the app 238 is shown as residing on participant device 230 in FIG. 2A, it should be understood that the app 238 can be a web-based application that is accessed from the device via network 290.

The user interface 232 and display may represent a common component or may represent separate physical or functional components. In some embodiments, the display may be a touchscreen, allowing the customer to interact with the user interface directly by touch. The user interface may refer to an operating system user interface or the interface of one or more software applications that may run on the participant device 230. In addition, in some embodiments, when the user launches the app 238 on participant device 230, they may be shown an option to initiate a screen sharing function, whereby content currently being displayed on the participant device 230 is transmitted to the agent computing device 210, or a videoconferencing functionality. In some embodiments, the user interface 216 can include a messaging window or other chat-space by which the support agent may send text messages or other digital content. Alternatively, in some embodiments, the customer can also speak with the support agent via a voice calling application on participant device 230, or directly through a telephone or other external device, such as a cell phone or more general videoconferencing system.

Thus, as a general matter, agent device 210, participant device 230, and the authentication system 250 (see FIG. 2B) can be configured to work in conjunction with the telephony/videoconferencing application ("application" or "app") such as a teleconferencing software application. For example, implementations described herein may be performed via any electronic communications between an agent and a customer including, but not limited to, telephone, video telephone, chat (e.g., IM, Slack™, Jabber™), video chat (e.g., Skype™, MS Teams™, Zoom™, Facetime™), internet based meetings (e.g., WebEx™), custom call-center systems, and other conference call systems. In addition, application can be configured to present various interfaces by which administrator or other users can interact with features of the system 250 (see FIG. 2B). In addition, the app 238 running on participant device 240 can include additional components enabling features by which control signals received from the authentication system may be executed. In other embodiments, the components can be configured as a simple software execution mechanism which receives, translates, and presents output in response to signals transmitted by the authentication system. In other embodiments, the app 238 is unnecessary, and the features described herein can be performed completely by the authentication system 250 based on image and/or audio data received via other sources such as conventional videoconferencing and telephony applications (e.g., Zoom®, Teams®, Slack®, etc.) or a standard telephone.

Although not shown in FIG. 2A, it should be understood that a virtual or human support agent can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, the agent device 210 can be connected to or include an internet customer interface for providing support specifically to customers or members who contact them via the Internet. As a general matter, support agent can refer to any person or personnel who offers the caller (or person who was called) assistance, and has access to features of the system 250 during the communication session with the customer.

During the communication session between the participant and the agent, control signals may be transmitted from the authentication system that cause a camera 234 and/or microphone 236 of the participant device 230 to capture image and/or audio data 214 from the participant. The data capture is configured to occur in response to a data capture control signal 216 generated by the authentication system. In some embodiments, the data capture control signal 216 is automatically triggered by the authentication system 250 automatically in response to a selection or request by the user for access to a secured resource requiring additional verification. In another embodiment, the agent can initiate the data capture manually, for example in a case where video or other forgery is suspected during the call.

Referring to FIG. 2B, in different embodiments, authentication system ("system") 250 is configured to receive a user request for access to secured resources 294 associated with a user account in user accounts database 296. In different embodiments, the system 250, agent device, and/or participant device may include one or more processors, non-transitory machine-readable storage media, and a data communication interface (e.g., NIC card), as well as user interface devices, for example, a monitor, touchscreen, mouse, or keyboard. These components can be implemented as computing devices or mobile devices, such as smart phones, personal digital assistants (PDAs), portable media players, smart watches, smart glasses, smart jewelry, smart apparel, laptops, notebooks, tablets, and others, and can include work stations, mainframes, non-portable computing systems, devices installed in structures, vehicles, and other types of installations.

In some embodiments, the system 250 is capable of communicating with external devices such as agent device (also referred to herein as an administrator computer) and the participant device through the network 290 using wired or wireless communication capabilities. The system 250 can be understood to comprise a cloud-based server and, along with the agent device, may include computing devices comprising any number of components, such as a Network Interface Card (NIC), allowing the respective devices to receive, transmit, process, and store information obtained from the image capture devices. In other words, the system 250 may include groups or subgroups of computing devices that can communicate with each other, but not necessarily with the computing devices in other groups or subgroups. The system 250 may include computing devices of disparate types, having different types of hardware and software configurations and in a variety of different locations. In some cases, multiple devices or subsystems can be identified together as a single computing device.

In different embodiments, the system 250 includes or is configured to access one or more databases, such as member profiles or user accounts database 296, and enable access to secured resources 294. The user accounts database 296 is a content library that stores account data related to one or more users. The data may include, for a plurality of users, name, personal and professional details, current and past policy for the user, credit limit of users, among other details. The database 296 can further include connection information for known (registered) user devices for which the user has authorized and enabled the input and execution of a control signal. In one embodiment, the registry maintains a listing of one or more computing devices for each end-user subscribed to the tic-based authentication feature. In different embodiments, the database 296 therefore includes a protocol providing communication with the app running on the user's devices. It can be understood that the end-user has also provided consent to the system for remote access and control of each of these registered devices as appropriate for authentication purposes.

As will be discussed in FIGS. 3 and 4 below, a pattern repository associated with accounts database 296 can store one or more reference pattern(s) 284 that include one or more visual and/or audio features that may be used for verification purposes. These patterns 284 are typically a few milliseconds to a few seconds in duration, though in some cases, based on the type of tic characteristic, the pattern saved can be of longer duration. During enrollment to the authentication service, the user's normal facial and other behavior and/or speech characteristics will be recorded and shared with two pattern detection modules (visual tics module 260 and audio tics module 282) for the authentication system 250.

In cases of video data, image processing 262 can be performed. In some embodiments, the processed image data is shared with a facial or body pose detector 264, which is configured to scan or evaluate the video in real or near-real time to identify segments of the video in which there is a greater likelihood of motor tics having occurred. For example, sudden changes in pose or expression can trigger the identification of a potential motor tic video segment which is then sent to a motor tics recognition model 270. The smaller segments allow for less intensive computing power and time needed for the identification of the tics. In other embodiments, the full video is shared with the motor tics recognition model 270. The motor tics recognition model 270 is configured to analyze facial and upper body characteristics and determine whether the video data includes a particular motor tic. The segment can then be classified as falling under a particular type or category of tic (see FIG. 2C), which is stored as reference pattern(s) 284.

Figure 2C:
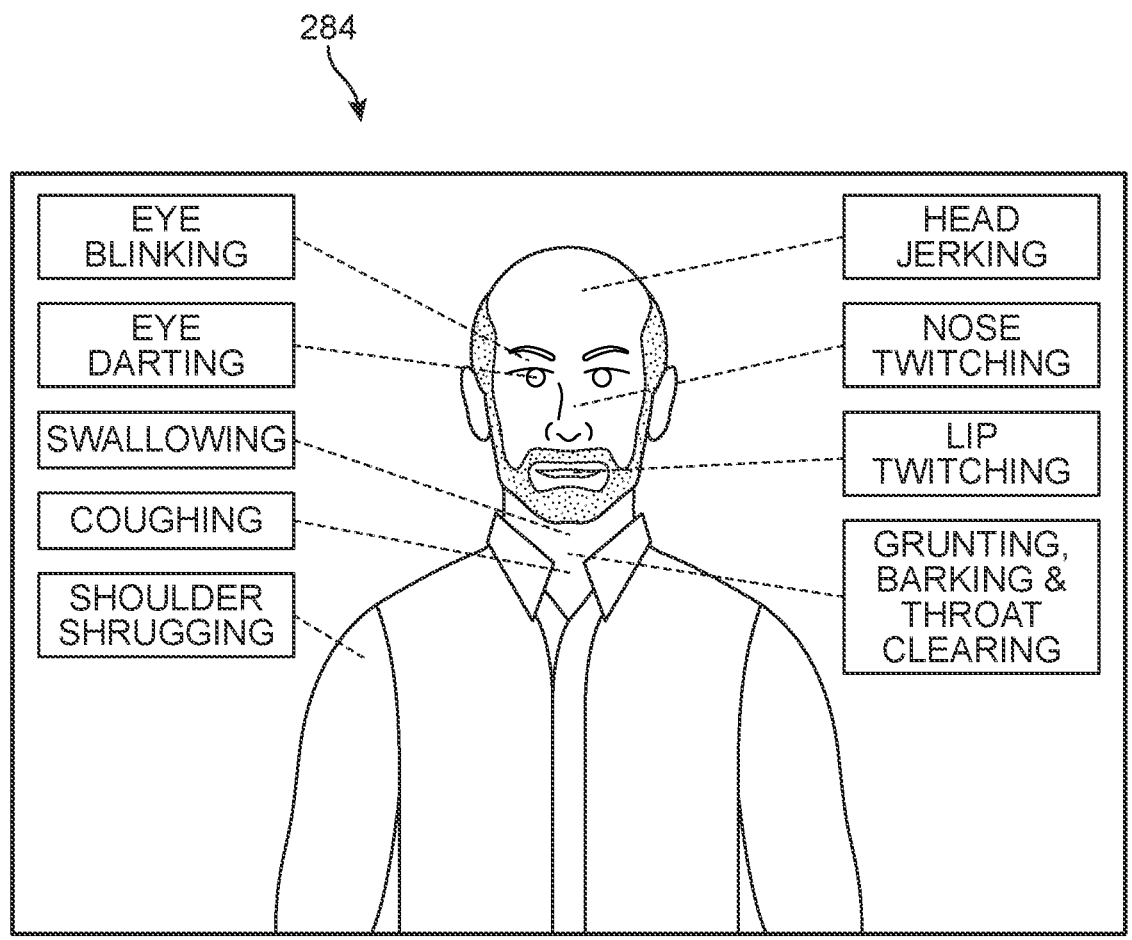

In cases of audio data, audio processing 266 can be performed. In some embodiments, the processed audio data is shared with an audio screening module 268, which is configured to scan or evaluate the audio in real or near-real time to identify segments of the audio in which there is a greater likelihood of verbal tics having occurred. For example, sudden changes in tone or unexpected noise can trigger the identification of a potential verbal tic audio segment which is then sent to an audio tics recognition model 272. The smaller segments allow for less intensive computing power and time needed for the identification of the tics. In other embodiments, the full audio recording is shared with the verbal tics recognition model 272. The verbal tics recognition model 272 is configured to analyze speech and other sound characteristics and determine whether the audio data includes a particular verbal tic. The segment can then be classified as falling under a particular type or category of tic (see FIG. 2C), which is stored as reference pattern(s) 284. Referring briefly to FIG. 2C, some non-limiting examples of motor and verbal tics that can serve as reference patterns 284 are presented. For example, motor tics can include (rapid) eye blinking, eye darting, swallowing, shoulder shrugging, head jerking, nose twitching, and lip or mouth twitching. In addition, verbal tics can include coughing, grunting, barking, and throat clearing.

Once one or more personalized reference patterns 284 for an individual user have been obtained, subsequent access sessions can conduct verification processes based on the stored patterns. Thus, when a user requests access to a secured resource, for example via a user interface presented on participant device 230 over network 290 (see FIG. 2A), data capture control signal 216 may be generated by system 250, causing recording of the user. In embodiments in which the pattern is visual, a camera control signal is configured to cause the camera 234 of participant device 230 to record images. Similarly, in embodiments in which the pattern is auditory, a microphone control signal is configured to cause the microphone 236 to record audio.

In some embodiments, the captured image data can be received by and processed via the image processing module 262 and/or the captured audio data can be received by and processed via the audio processing module 266. In different embodiments, only one of the two data types may be collected and used by an authenticity determination module 274, while in other embodiments, both types of data will be used. In embodiments capturing image data, image signal processing algorithms and/or software (e.g., image processing module 262) can perform pre-processing and processing of the captured image data. For example, the image input can be cleansed and normalized by the image processing module 262. In different embodiments, various image processing algorithms and/or software may be used with captured image data. In one embodiment, the image processing algorithms perform compression, artifact correction, noise reduction, color corrections, geometric corrections, imager non-uniformity correction, etc., and various image processing enhancement operations on the image content. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms. In another embodiment, one or more of the operations of image processing module 262 can be performed by image processing components of the participant device before the image data is sent to the system 250.

In some embodiments, image processing may also include machine learning techniques that can be used to discriminate between features and to identify objects, for example via image recognition and object detection software. Such techniques may also include machine vision algorithms that perform, among other operations, symbol and logo recognition, general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD.

Once the data has been processed, relevant features may be extracted for use as input by the motor tics recognition model 264, such as micro-expression or macro-expression facial behavior. As a general matter, facial micro-expressions are rapid involuntary facial expressions which reveal suppressed affect. Micro-expressions are typically very rapid ($\frac{1}{3}$ to $\frac{1}{25}$ second; the precise length definition varies) involuntary facial expressions which are instinctual and generally cannot be faked.

The motor tics recognition model 264 receives the processed image data. A wide range of algorithms for classifying facial-based or body movement data are available. For example, motor tics recognition model 264 may use facial geometric features, appearance-based facial features, and a combination of these two features to perform facial and gaze recognition and detection. In some cases, the motor tics recognition model can divide the face into many small-size grids, and the features from all these grids are concatenated to identify the facial expressions. Region of Interest (ROI) features from facial images and thermal images may also be used for detecting tics, or other available motion and physical feature detection software.

In one embodiment, the system 250 is configured to compare the detected involuntary response against the reference response via a response match determination module of the authenticity determination module 274. If the behaviors match within certain parameters, the user is deemed to pass the authentication or verification test, indicating with a high likelihood that the user is indeed the account holder or other authorized person. In some embodiments, the image data is processed and models or representations of the image are built. These models are compared against one another. In different embodiments, one or both samples may be deemed unacceptable or unusable if the image is too bright or too dark, or if there is too much noise (poor signal to noise ratio). If a sample is not acceptable the system may request an additional or further sample.

If the image data is acceptable or sufficient, a scoring occurs via the authenticity determination module 270. The scoring process is analogous to "what is the probability that the behavior captured by the camera is the same as the verification reference sample(s) stored in the reference response database for the user?" Thus, in some embodiments, the determination of a "match" is not necessarily based on the verification/reference sample directly or exactly matching the content of the image sample, but rather on the two samples being substantially similar or sharing particular features. The returned score is evaluated against a threshold value to determine if it meets or exceeds the minimum acceptable score by authenticity determination module 274. If the score is determined to represent a successful match, the system 250 and/or agent may allow a user to proceed further within a call center or telephone banking menu system or other secured resource 294 being safeguarded by the service provider.

Thus, if a match is found or is in an acceptable range, the access to secured resource(s) 294 by the user will be allowed and/or enabled via access gateway 292. Otherwise, access is denied, or blocked pending further verification. In some embodiments, the system is configured to then automatically generate a message indicating an unauthorized attempt to access the secured resource may have occurred. In some embodiments, this message can be automatically transmitted by the platform to the user's account address or other communication channel on record in accounts database 296 for the registered user.

As noted above in FIG. 2A, in different embodiments, the participant device 236 includes microphone 262 that is linked to or otherwise integrated within a unit configured to capturing sounds in the participant's physical environment. When a user requests access to a secured resource, for example via a user interface of app 238, the system 250 can also or alternatively be configured to capture audio from the user device.

In different embodiments, in cases of a verbal tic by the participant, various audio signal processing algorithms and/or software (e.g., audio processing module 266) be processed either at the participant device and/or via audio processing module in order to extract user's sounds, which is then provided to a sound characteristic recognition audio screening module 268, which will identify segments of audio during which the participant appears to have produced a verbal tic.

Once the data has been processed, relevant features may be extracted for use as input by the audio screening module 268, for example based on the detection of non-speech sounds, sudden changes in pitch or other prosodic characteristics, or repetitive sounds. The verbal tics recognition model 272 receives the audio samples. As a general matter, these audio micro-expressions are rapid involuntary verbal expressions which reveal suppressed affect. In one embodiment, the system 250 is configured to compare the detected involuntary response against the reference response via a response match determination module of the authenticity determination module 274. If the audio samples match within certain parameters, the user is deemed to pass the authentication or verification test, indicating with a high likelihood that the user is indeed the account holder or other authorized person. In some embodiments, the audio data is processed and models or representations of the image are built. These models are compared against one another. In different embodiments, one or both samples may be deemed unacceptable or unusable if the audio is too loud or too soft, or if there is too much noise (poor signal to noise ratio). If a sample is not acceptable the system may request an additional or further sample.

If the audio data is acceptable or sufficient, a scoring occurs via the authenticity determination module 270. The scoring process is analogous to "what is the probability that the behavior captured by the microphone is the same as the verification reference sample(s) stored in the reference response database for the user?" Thus, in some embodiments, the determination of a "match" is not necessarily based on the verification/reference sample directly or exactly matching the content of the audio sample, but rather on the two samples being substantially similar or sharing particular features. The returned score is evaluated against a threshold value to determine if it meets or exceeds the minimum acceptable score by authenticity determination module 274. If the score is determined to represent a successful match, the system 250 and/or agent may allow a user to proceed further within a call center or telephone banking menu system or other secured resource 294 being safeguarded by the service provider.

Thus, if an audio match is found or is in an acceptable range, the access to secured resource(s) 294 by the user will be allowed and/or enabled via access gateway 292. Otherwise, access is denied, or blocked pending further verification. In some embodiments, the system is configured to then automatically generate a message indicating an unauthorized attempt to access the secured resource may have occurred. In some embodiments, this message can be automatically transmitted by the platform to the user's account address or other communication channel on record in accounts database 296 for the registered user.

It can be appreciated that authentication based on verification of the user's response to a visual or audio signal at the known user device strongly implies that the user's identity is true and correspondingly is in fact entitled to whatever access is being requested. It should be understood that while the system 250 bases access decisions at least in part on the detection of the appropriate response from the user, the system is in some embodiments further configured to first confirm that the user ID and optional password match based on information available in the user accounts database 296.

It should be understood that a support agent (human or virtual) can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, the agent device 210 can be connected to or include an internet customer interface for providing support specifically to customers or members who contact them via the Internet. As a general matter, support agents or service representatives can refer to any person or personnel who offers the caller (or person who was called) assistance, and has access to the system 250 during the communication session with the customer. In one example, rather than automatically providing access to the account, the authenticity determination module 274 can generate a communication for the human agent to review that includes the results of its determination. The human agent can then, based in part on the system's authenticity determination, decide to provide access to the secured resources 294.

Figure 3:
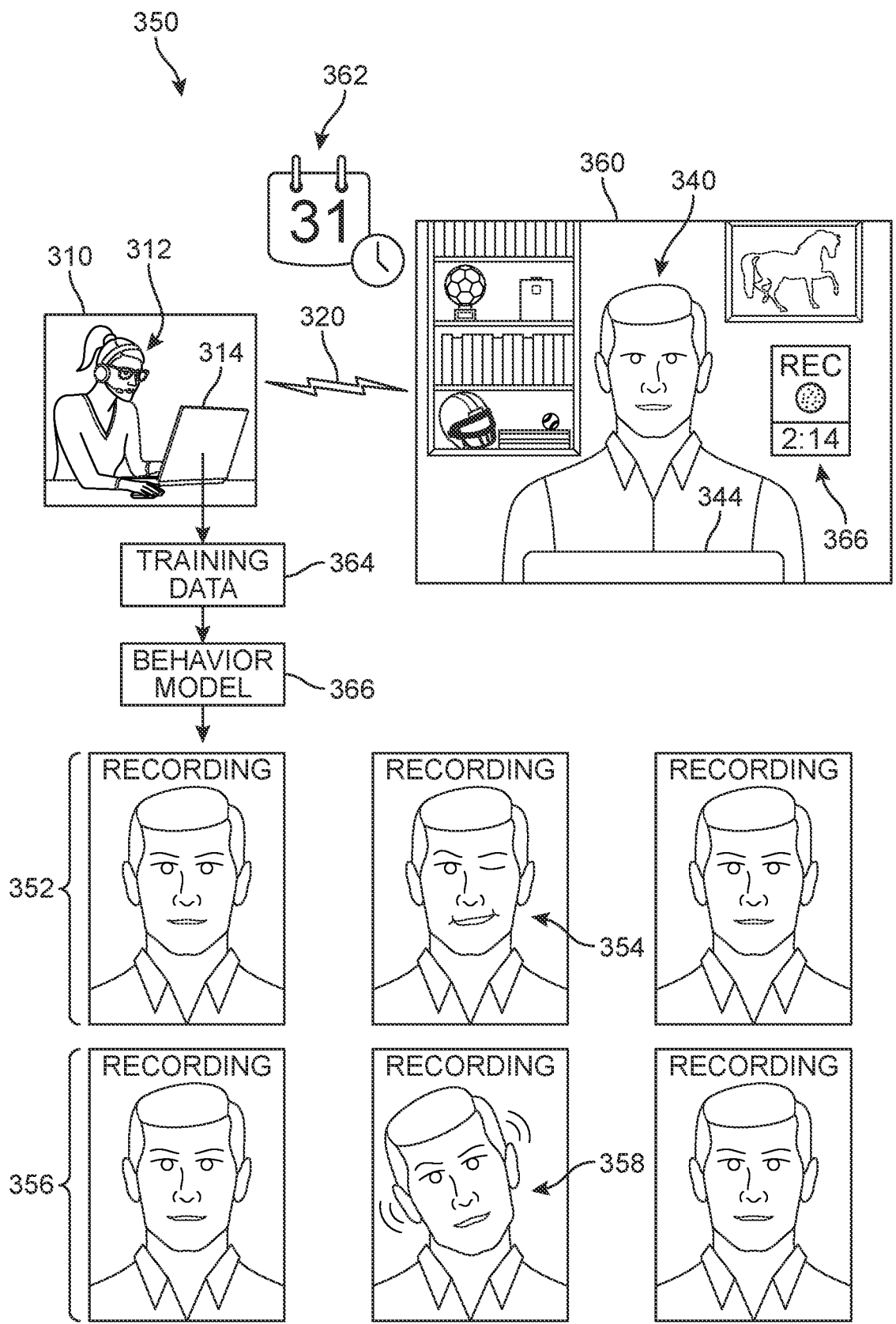
FIGS. 3 and 4 depict an example of a user enrolling in the tic behavior detection-based authentication system, according to an embodiment.
Figure 4:
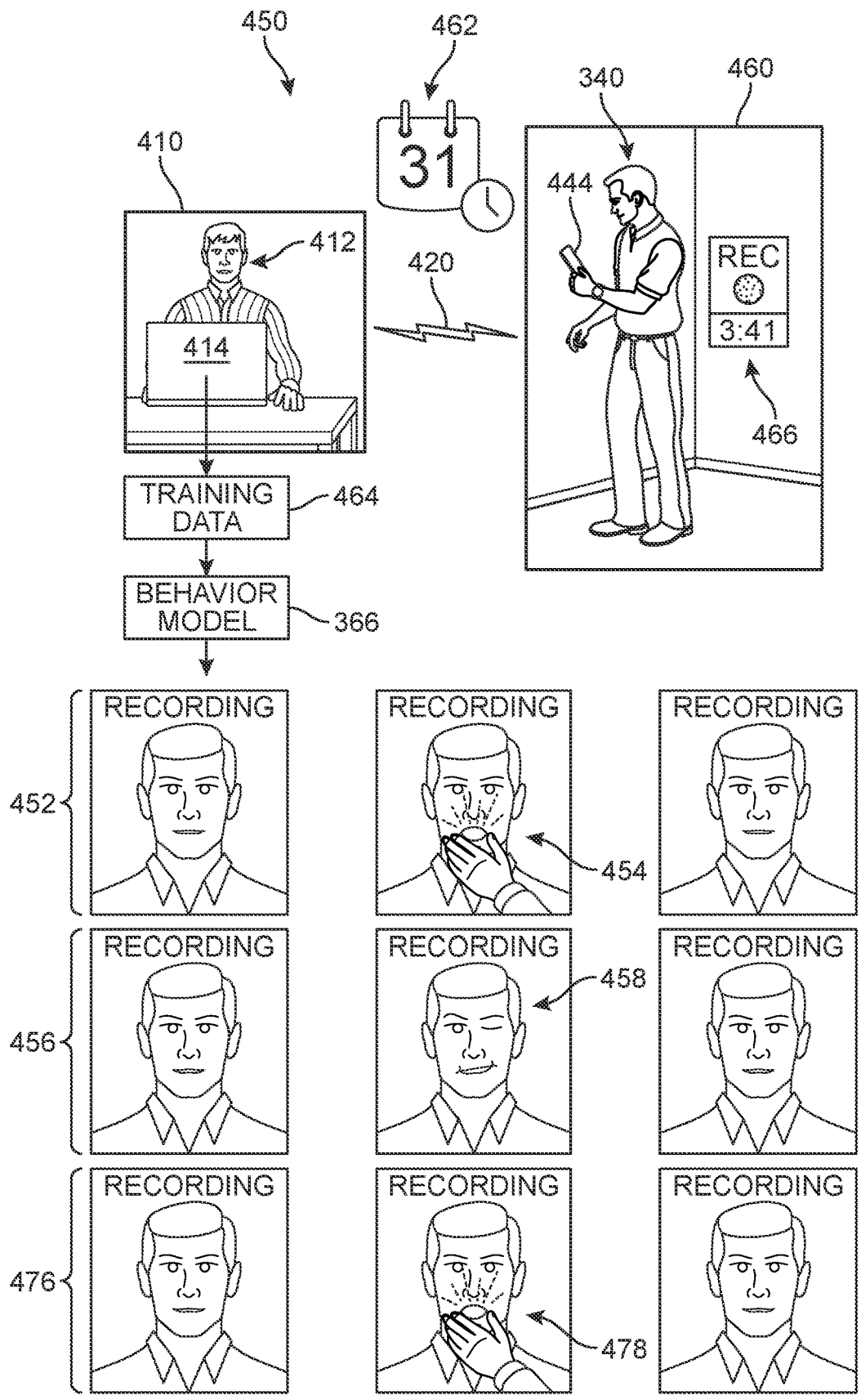

Referring now to FIGS. 3 and 4, an example of enrollment or training and record acquisitions ("data collections") for collection of user-specific training data that may be used by the proposed systems is depicted. The data collections can, in some embodiments, occur at the same time as a standard communication session with an agent (virtual or human) (i.e., data captured during a call or other communication with the service). In other embodiments, the data collections can be performed separately, via a remote computing device or for example at an in-person location such as a bank or other institution, where additional layers of verification may also be obtained before the computing device records the user's behavior. The image and/or audio capture represents the acquisition of training data from which the system will identify recurring behaviors, such as vocal tics and/r motor tics, of an individual and will then be associated with the user's account and stored in a database for later reference. In FIG. 3, during a first data collection 350, a second user 340 is located in a first location 360 that is remote relative to a second location 310 for a second agent 312.

In this case, the second user 340 is, via a second computing device ("second device") 344, interacting with the access management system and communicating with the second agent 312 over network 320. The second agent 312 is communicating with the second user 340 via a third computing device ("third device") 314 located at a remote site 310. For purposes of this example, the second user 340 has requested and/or been offered the opportunity to register or enroll a reference pattern with his account. In this case, a first user interface ("first interface") providing a chat window open on a desktop (second device 344) allows the second user 340 to partake in an instant messaging session with the second agent 312. In other embodiments, the communication can occur in part or fully via a video conferencing interface whereby the second agent 312 and second user 340 speak in real-time over a video screen. Once the second user 340 provides his consent to the enrollment, an image capturing event is automatically triggered by the system or initiated by the second agent 312, and image and/or audio data ("first training data") 364 collected by an image sensor (i.e., a camera and/or microphone) during a first time 362.

In different embodiments, a user can communicate via an interface generated by an application provided by access management system. The application can offer a user interface that may be accessed via any user computing device configured for connection to a network. In different embodiments, the application can be configured to offer content via native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touchscreen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In FIG. 3, the first training data 364 corresponds to a substantially continuous video recording 366 that can include several seconds to several minutes of video and audio (shown here as 2 minutes and 14 minutes of video). For purposes of example, during processing by a behavior model 366 (see FIG. 2A), the first training data 362 is deemed to include at least two primary segments, including a first segment 352 and a second segment 354, in which a particular behavior is detected by the model (see FIG. 2A). The first segment 352 includes a first reference behavior 354 (shown as a motor tic in which the right eye is winked), and the second segment 356 includes a second reference behavior 358 (shown as a motor tic in which the user's head shakes back and forth).

Referring next to FIG. 4, at a second time 462 (subsequent to the first time 362 of FIG. 3), a second data collection 450 is performed. In FIG. 4, the second user 340 is now located in a third location 460, that is also remote relative to a fourth location 410 for a third agent 412. In this case, the second user 340 is, via a fourth computing device ("fourth device") 444, interacting with the access management system and communicating with the third agent 412 over network 420. The third agent 412 is communicating with the second user 340 via a fifth computing device ("fifth device") 414 located at a remote site 410. For purposes of this example, the second user 340 has again requested and/or been offered the opportunity to register or enroll a reference pattern with his account. In this case, a second user interface ("second interface") allows the second user 340 to partake in a video conference with the third agent 412 via his mobile device.

Once the second user 340 provides his consent to the recording, an image capturing event is automatically triggered by the system or initiated by the third agent 412, and image and/or audio data ("second training data") 464 collected by an image sensor (i.e., a camera and/or microphone) during the second time 462. In different embodiments, the second training data 464 and other data collected during subsequent authentication sessions are processed by behavior model 366 in a similar manner to extract the set(s) of features which can then be stored as reference patterns in the database for later use.

In FIG. 4, the second training data 464 corresponds to a substantially continuous video recording 466 that can include several seconds to several minutes of video and audio (shown here as 3 minutes and 41 minutes of video). For purposes of example, during processing by the behavior model 366, the second training data 462 includes at least three primary segments, including a third segment 452, fourth segment 456, and a fifth segment 476, in which a particular behavior is detected by the model (see FIG. 2A). The third segment 452 includes a third reference behavior 454 (shown as a verbal tic in which the user clears his throat), the fourth segment 456 includes a fourth reference behavior 458 (shown as a motor tic in which the right eye is winked), and a fifth segment 476 includes a fifth reference behavior 478 (shown as a repeat of the verbal tick in which the user clears his throat).

It can be appreciated that in different embodiments, the second user 340 may opt to register multiple reference patterns with his account. In addition, in different embodiments, the user may opt to provide training data updates at different intervals. For example, the user may move residences or change jobs, or experience some other change that may affect the type or intensity of his or her tics, and therefore they may request to submit new training data. In other cases, the merchant or other authentication entity may require or recommend that participants provide new training data twice a year, once a month, or at other less or more frequent intervals to ensure the reference pattern that is stored is up-to-date. In one embodiment, the reference pattern can be associated with an expiration date or period of time after which the participant will be required to provide new (current) image data. In some embodiments, an account for the customer verifying their identification credentials can also be linked to the customer's reference pattern at or around that time. Thus, a verification process may occur in conjunction with the collection of the initial image data, whereby the participant presents identity documents that can be used to confirm the user's identity. The user identity can then be linked to the reference pattern in the record. In some embodiments, the object token(s) and/or account can be further linked to the customer's credit and/or payment details that can facilitate or even automate various retail merchandise transaction processes. In addition, in some embodiments, the record or user account may identify an authorization type or level that the customer is to be granted.

Figure 5:
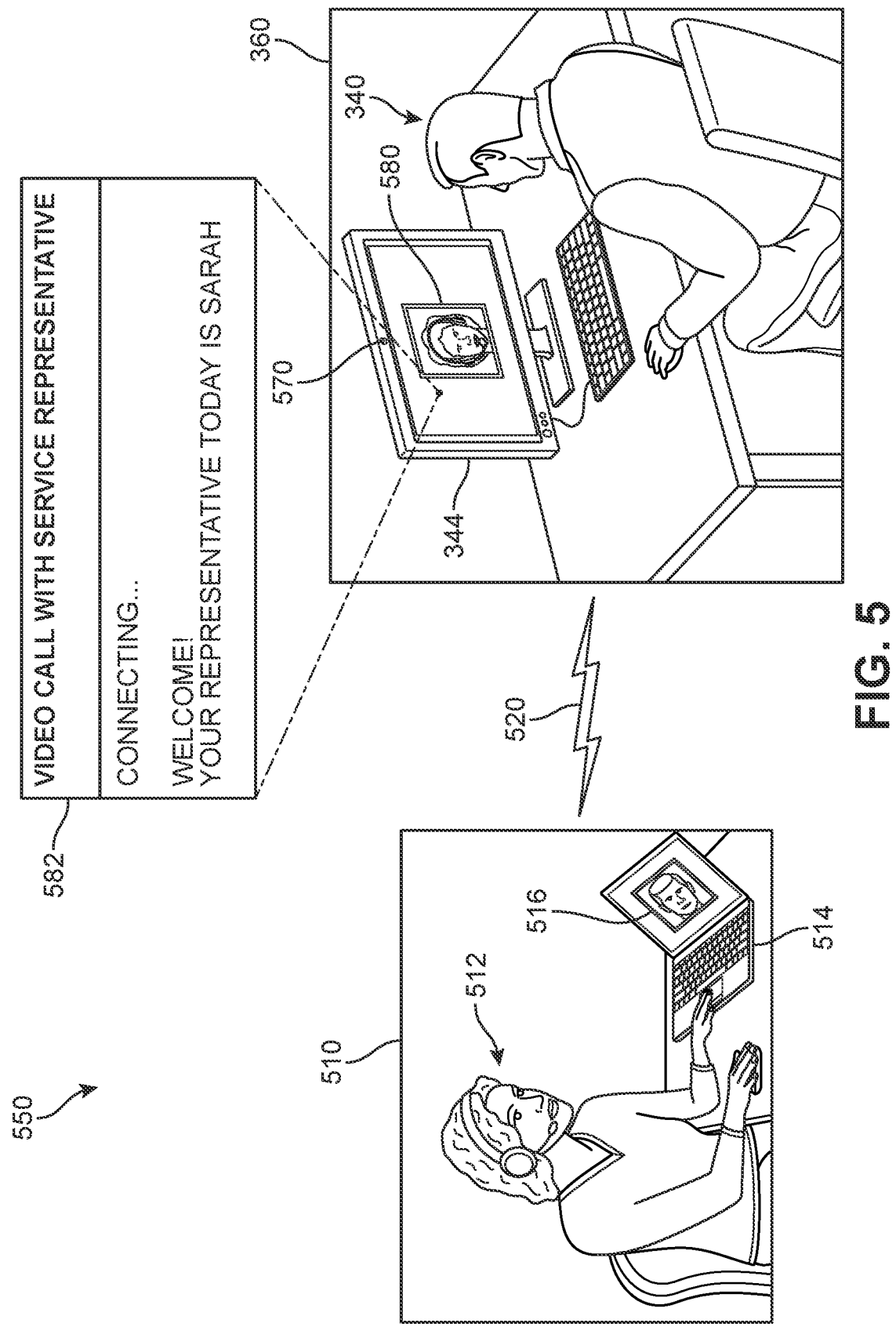
FIG. 5 is an illustration of a person engaged in a video communication session with a service representative seeking access to a secured resource, according to an embodiment.
Figure 6:
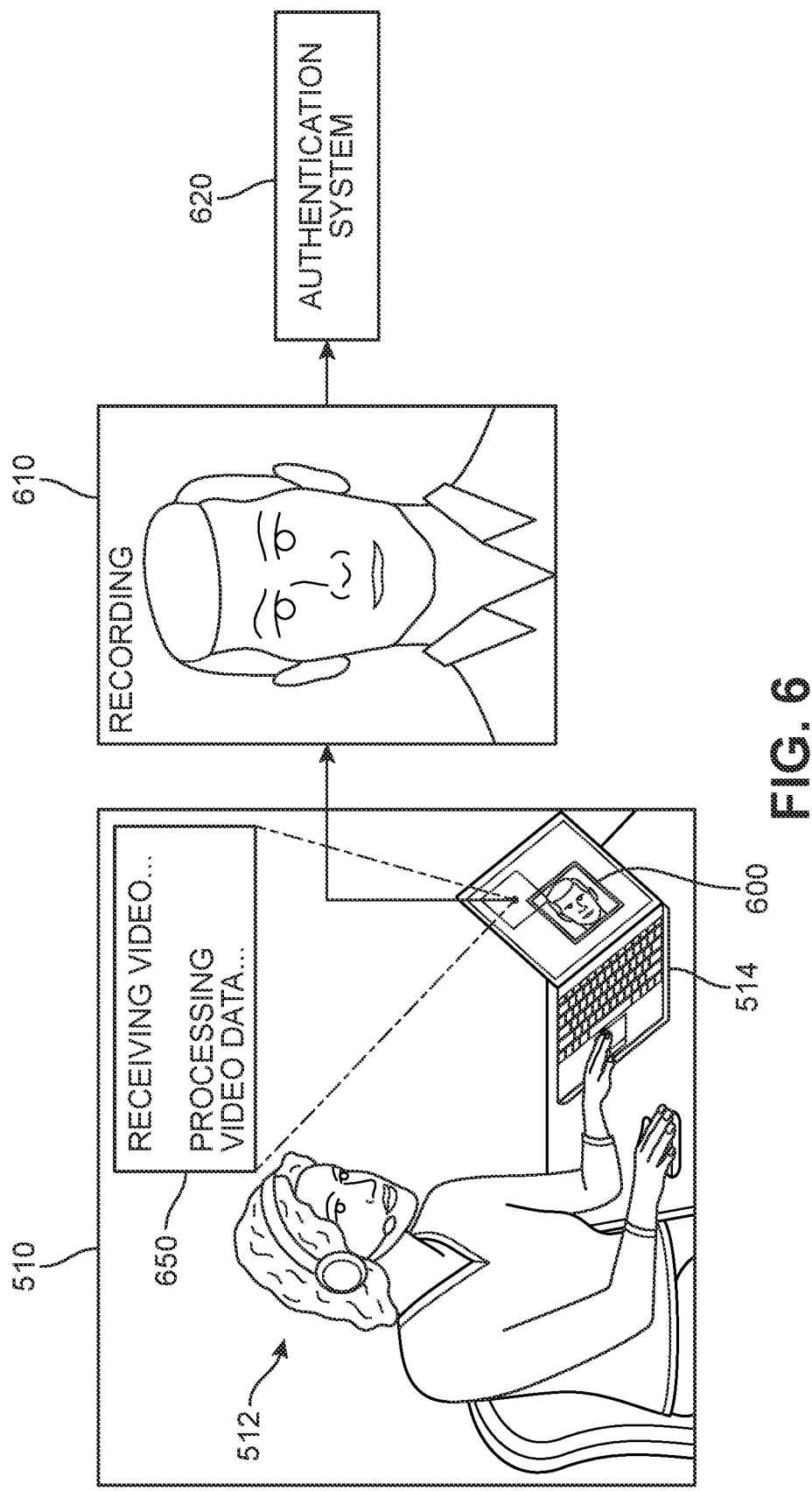
FIG. 6 is an illustration of image data being captured of the person in order to determine if a specific tic behavior is present, according to an embodiment.
Figure 7:
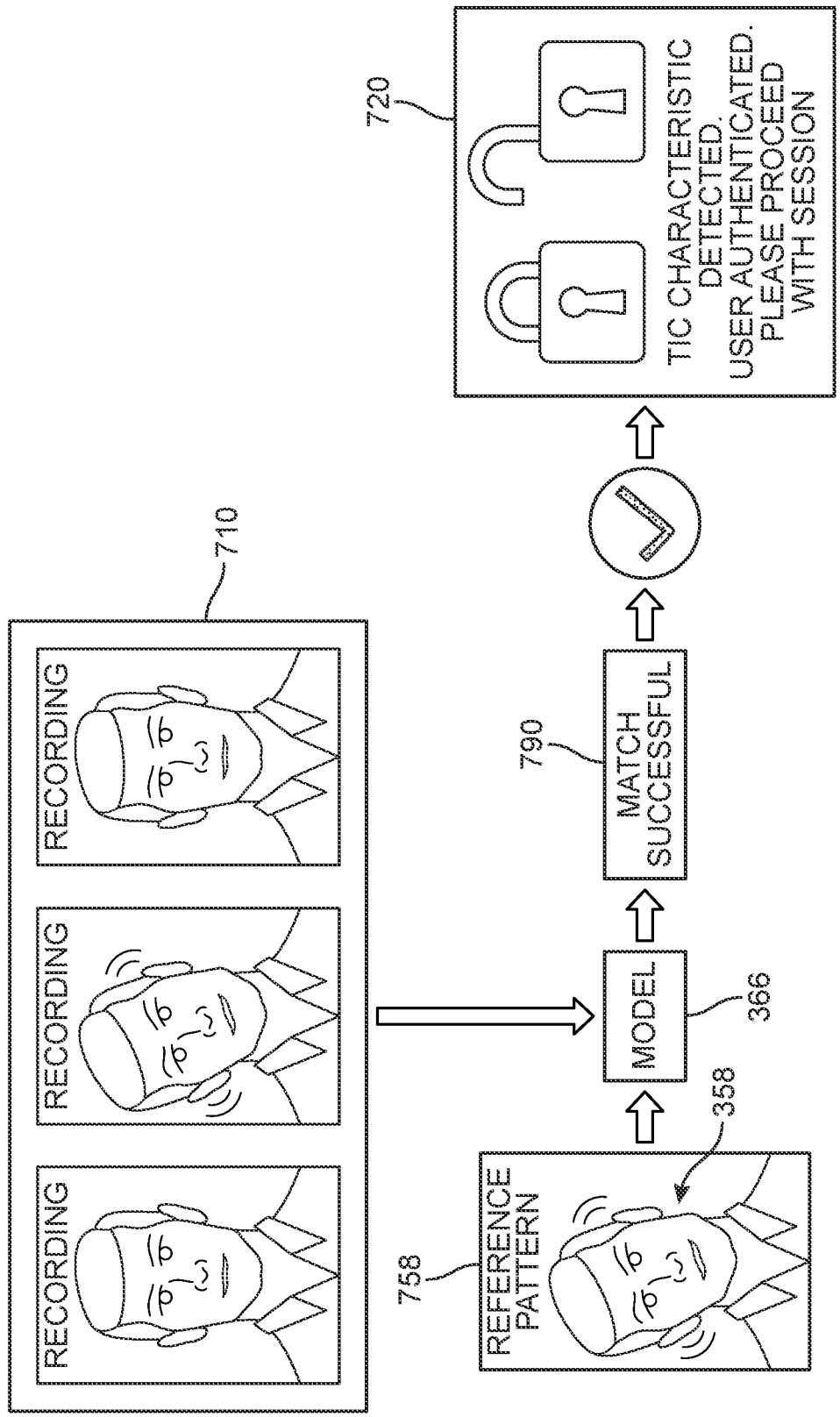
FIG. 7 depicts an example of a system determination that the image data includes the expected tic behavior, resulting in the system granting access to the secured resource, according to an embodiment.

Referring now to FIGS. 5-7, an example of an authentication scenario occurring during a communication session 550 between the second user 340 and a fourth agent 512 is depicted. In FIG. 5, the second user 340 is, via the second device 344 at the first location 360, interacting with the access management system app and communicating with the fourth agent 512 via network 520. The fourth agent 512 is communicating with second user 340 via a sixth computing device ("sixth device") 514 located at a call center 510 or other space remote relative to the second user 340.

For purposes of this example, the second user 340 has requested access to secured resources associated with a user account managed by the entity which fourth agent 512 is representing. In this case, a third user interface ("third interface") 580 provides a video window to allow the second user 340 to partake in the communication session 550 with the fourth agent 512 ("Video Call with Service Representative/Connecting . . . Welcome! Your representative today is Sarah"). In other embodiments, the communication can occur in part or fully via an audio-conferencing interface whereby the fourth agent 512 and second user 340 speak in real-time via a telephone or other VoIP.

In different embodiments, once the second user 340 requests access to the secured resource, an image capturing event can be automatically triggered by the system or initiated by the fourth agent 512, and sensor data is collected by an image sensor ("camera") 570 associated with the user's device. During this process, the second user 340 is positioned in front of the field of view of camera 570 for the second device 344, ensuring that camera 370 is able to capture each change in expression. It should be understood that in some embodiments, the user will not be informed that the authentication process is occurring, as the user previously provided his consent for this security verification.

Referring next to FIG. 6, a depiction of video 600 as received by the sixth device 514 is shown to the fourth agent 512. First image data 610 from video 600 is captured at a first time, in this case near the beginning of the communication session. The first image data 610 may be provided to authentication system 620 for processing, as indicated by a first status message 650 ("Receiving Video . . . Processing Video Data"). The image data is processed in order to extract relevant features, as shown in the example of FIG. 7, where a feature segment 710 has been extracted, comprising a second reference behavior 358 that was previously stored as a reference pattern 558.

Once this behavior is captured, the model 366 determines if there is enough of a similarity so as to be classified as a match with the reference pattern 558. In this case, the model 366 classifies the image data as being a match 790, and a status message 720 ("Tic Characteristic Detected. User authenticated. Please proceed with session") is automatically presented to the agent. The system can then automatically enable or grant the second user 340 access to the secured resource, or the agent can respond to the verification by manually enabling access.

Figure 8:
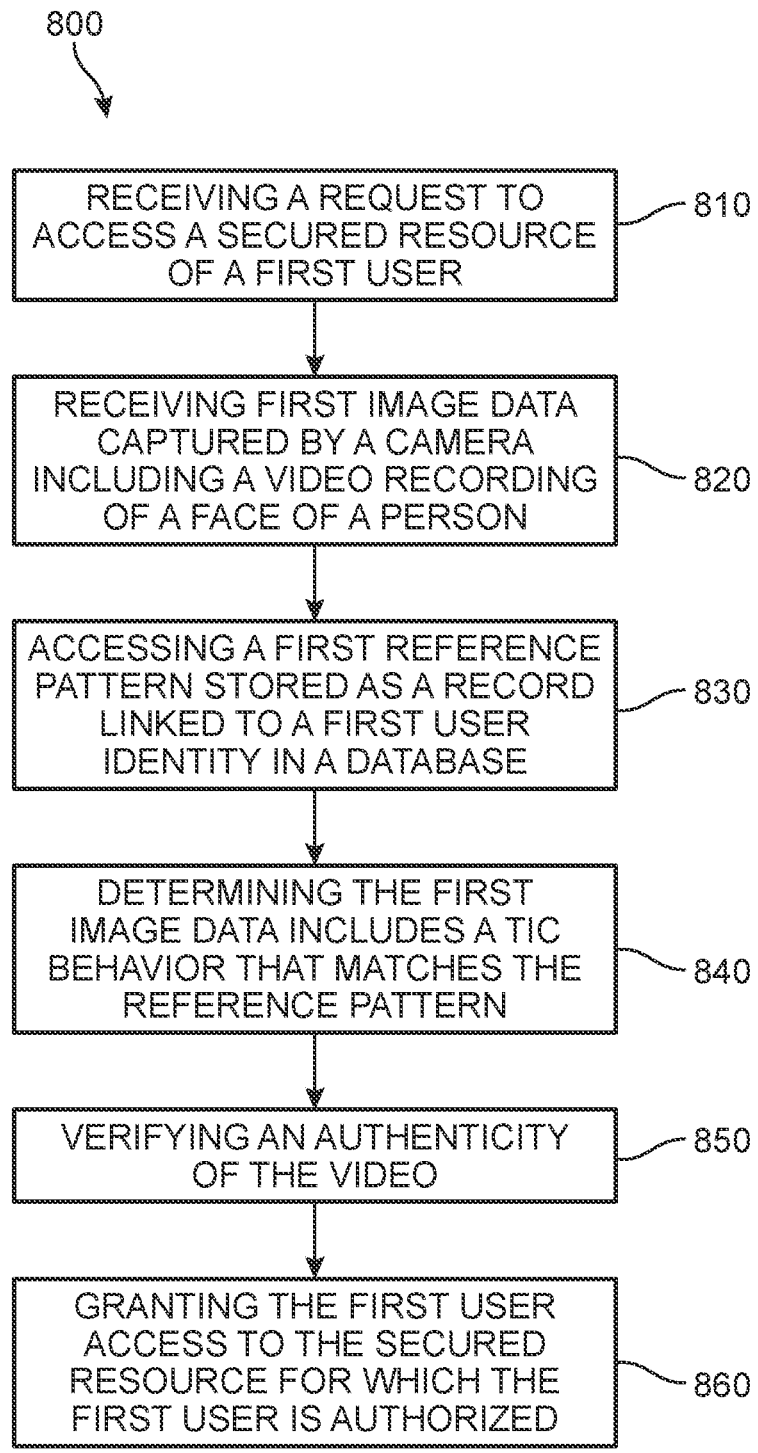
FIG. 8 is a flow chart depicting a process of verifying an authenticity of video in order to protect user resources, according to an embodiment.

FIG. 8 is a flow chart illustrating an embodiment of a method 800 of verifying an authenticity of video in order to protect user resources. The method 800 includes a first step 810 of receiving, at a cloud-based authentication system and from a first computing device, a request to access a secured resource of a first user, and a second step 820 of receiving at a first time, at the authentication system, first image data captured by a camera of the first computing device, where the first image data include a video recording of a face of a person. A third step 830 includes accessing a first reference pattern stored as a record linked to a first user identity in a database, and a fourth step 840 includes determining, at the authentication system, that the first image data includes a tic behavior that is sufficiently similar to the reference pattern so as to be classified as a match. Furthermore, the method 800 includes a fifth step 850 of verifying, in response to the tic behavior matching the reference pattern, an authenticity of the video, and a sixth step 860 of granting the first user access to the secured resource for which the first user is authorized.

In other embodiments, the method may include additional steps or aspects. In some embodiments, the method also includes a step of receiving second image data at a second time earlier than the first time. In such cases, the second image data can include image content of the first user while the first user is exhibiting a motor tic, and the reference pattern is based on the second image data. In one embodiment, the motor tic comprises one of a rapid eye blinking, eye darting, swallowing, shoulder shrugging, nose twitching, head jerking, and lip twitching. In some embodiments, the method also includes steps of employing, prior to the first time, a verification process to verify that the first user is associated with the first user identity, generating the record that links the second image data to the first user identity, and storing the record in the database. In another example, the method can also include steps of receiving, at the authentication system, third image data captured by a camera of a second computing device, the third image data including a video recording of a face of a person, determining, at the authentication system, the third image data includes a first tic behavior, extracting, at the authentication system, a first image segment from the third image data in which the first tic behavior occurs, and storing the first image segment as second image data providing the reference pattern.

In some embodiments, the method further includes a step of capturing the first image data via an image sensor of the first computing device when the first user is also in range of the image sensor. In one example, the secured resource includes one of a service, feature, and information for which access is restricted to one or more authorized persons. In another example, the first image data is obtained during a videoconferencing session between the first user and a service representative associated with the secured resource.

Other methods may be contemplated within the scope of the present disclosure. For example, in some embodiments, a method of verifying an authenticity of a voice in order to protect user resources is disclosed. The method includes a first step of receiving, at a cloud-based authentication system and from a first computing device, a request to access a secured resource of a first user, and a second step of receiving at a first time, at the authentication system, first audio data captured by a microphone of the first computing device, the first audio data including a voice recording of a person. A third step involves accessing a reference pattern stored as a record linked to a first user identity in a database, and a fourth step includes determining, at the authentication system, that the first audio data includes a tic behavior that is sufficiently similar to the reference pattern so as to be classified as a match. In addition, a fifth step includes verifying, in response to the tic behavior matching the reference pattern, an authenticity of the voice as belonging to the first user, and a sixth step includes granting the first user access to the secured resource for which the first user is authorized.

In such embodiments, the method may include additional steps or aspects. For example, in some embodiments, the method also includes a step of receiving second audio data at a second time earlier than the first time. In such cases, the second audio data includes audio content of the first user while the first user is expressing a verbal tic, and the reference pattern is based on the second audio data. In another example, the verbal tic comprises one of a coughing, grunting, barking, and throat clearing. In some embodiments, the method also includes employing, prior to the first time, a verification process to verify that the first user is associated with the first user identity, generating the record that links the second audio data to the first user identity, and storing the record in the database. In one embodiment, the secured resource includes one of a service, feature, and information for which access is restricted to one or more authorized persons. In some embodiments, the first audio data is obtained during a teleconferencing session between the first user and a service representative associated with the secured resource.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of verifying an authenticity of video in order to protect user resources, the method comprising:
    receiving, at a cloud-based authentication system and from a first computing device, a request to access a secured resource of a first user;
    receiving at a first time, at the authentication system, first image data captured by a camera of the first computing device, the first image data including a video recording of a face of a person comprising video data and audio data;
    extracting one or more potential motor tic video segments from the video data and one or more potential verbal tic audio segments from the audio data;
    accessing a first expected reference pattern that should occur during interactions with the first user that is stored as a record linked to a first user identity in a database;
    determining, at the authentication system, using only the potential motor tic video segments and the potential verbal tic audio segments that the first image data includes a tic behavior that is sufficiently similar to the expected reference pattern so as to be classified as a match, the tic behavior comprising nonrhythmic stereotyped movements and sounds produced secondary to irresistible urges that appear purposeless, are specific to the person and occur in a similar manner each time they are performed;
    verifying, in response to the tic behavior matching the expected reference pattern, an authenticity of the video recording; and
    thereby granting the first user access to the secured resource for which the first user is authorized using only the verified authenticity of the video recording.

2. The method of claim 1, further comprising receiving second image data at a second time earlier than the first time, wherein the second image data includes image content of the first user while the first user is exhibiting a motor tic, and the expected reference pattern is based on the second image data.

3. The method of claim 2, wherein the motor tic comprises one of a rapid eye blinking, eye darting, swallowing, shoulder shrugging, nose twitching, head jerking, and lip twitching.

4. The method of claim 2, further comprising:
    employing, prior to the first time, a verification process to verify that the first user is associated with the first user identity;
    generating the record that links the second image data to the first user identity; and
    storing the record in the database.

5. The method of claim 2, further comprising:
    receiving, at the authentication system, third image data captured by a camera of a second computing device, the third image data including a video recording of a face of a person;
    determining, at the authentication system, the third image data includes a first tic behavior;
    extracting, at the authentication system, a first image segment from the third image data in which the first tic behavior occurs; and
    storing the first image segment as second image data providing the expected reference pattern.

6. The method of claim 1, further comprising capturing the first image data via an image sensor of the first computing device when the first user is also in range of the image sensor.

7. The method of claim 1, wherein the secured resource includes one of a service, feature, and information for which access is restricted to one or more authorized persons.

8. The method of claim 1, wherein the first image data is obtained during a videoconferencing session between the first user and a service representative associated with the secured resource.

9. A computer-implemented method of verifying an authenticity of a voice in order to protect user resources, the method comprising:
    receiving, at a cloud-based authentication system and from a first computing device, a request to access a secured resource of a first user;
    receiving at a first time, at the authentication system, first audio data captured by a microphone of the first computing device, the first audio data including a voice recording of a person;
    extracting one or more potential verbal tic audio segments from the first audio data;
    accessing an expected reference pattern that should occur during interactions with the first user that is stored as a record linked to a first user identity in a database;
    determining, at the authentication system, using only the potential verbal tic audio segments that the first audio data includes a tic behavior that is sufficiently similar to the expected reference pattern so as to be classified as a match, the tic behavior comprising nonrhythmic set movements and sounds produced secondary to irresistible urges that appear purposeless, are specific to the person and occur in a similar manner each time they are produced;
    verifying, in response to the tic behavior matching the expected reference pattern, an authenticity of the voice recording as belonging to the first user; and
    thereby granting the first user access to the secured resource for which the first user is authorized using only the verified authenticity of the first audio data.

10. The method of claim 9, further comprising receiving second audio data at a second time earlier than the first time, wherein the second audio data includes audio content of the first user while the first user is expressing a verbal tic, and the expected reference pattern is based on the second audio data.

11. The method of claim 10, wherein the verbal tic comprises one of a coughing, grunting, barking, and throat clearing.

12. The method of claim 10, further comprising:
employing, prior to the first time, a verification process to verify that the first user is associated with the first user identity;
generating the record that links the second audio data to the first user identity; and
storing the record in the database.

13. The method of claim 9, wherein the secured resource includes one of a service, feature, and information for which access is restricted to one or more authorized persons.

14. The method of claim 9, wherein the first audio data is obtained during a teleconferencing session between the first user and a service representative associated with the secured resource.

15. A system for verifying an authenticity of video in order to protect user resources, the system comprising a processor and machine-readable media including instructions which, when executed by the processor, cause the processor to:
receive, at a cloud-based authentication system and from a first computing device, a request to access a secured resource of a first user;
receive at a first time, at the authentication system, first image data captured by a camera of the first computing device, the first image data including a video recording of a face of a person comprising video data and audio data;
extracting one or more potential motor tic video segments from the video data and one or more potential verbal tic audio segments from the audio data;
access an expected reference pattern that should occur during interactions with the first user that is stored as a record linked to a first user identity in a database;
determine, at the authentication system, using only the potential motor tic video segments and the potential verbal tic audio segments that the first image data includes a tic behavior that is sufficiently similar to the expected reference pattern so as to be classified as a match, the tic behavior comprising nonrhythmic set movements and sounds produced secondary to irresistible urges that appear purposeless, are specific to the person and occur in a similar manner each time they are produced;
verify, in response to the tic behavior matching the expected reference pattern, an authenticity of the video; and
thereby grant the first user access to the secured resource for which the first user is authorized using only the verified authenticity of the video.

16. The system of claim 15, wherein the instructions further cause the processor to receive second image data that includes image content of the first user while the first user is exhibiting a motor tic, and the expected reference pattern is based on the second image data.

17. The system of claim 16, wherein the motor tic comprises one of a rapid eye blinking, eye darting, swallowing, shoulder shrugging, nose twitching, head jerking, and lip twitching.

18. The system of claim 16, wherein the instructions further cause the processor to:
employ, prior to the first time, a verification process to verify that the first user is associated with the first user identity;
generate the record that links the second image data to the first user identity; and
store the record in the database.

19. The system of claim 16, wherein the instructions further cause the processor to:
receive, at the authentication system, third image data captured by a camera of a second computing device, the third image data including a video recording of a face of a person;
determine, at the authentication system, the third image data includes a first tic behavior;
extract, at the authentication system, a first image segment from the third image data during which the first tic behavior occurs; and
store the first image segment as second image data providing the expected reference pattern.

20. The system of claim 15, wherein the secured resource includes one of a service, feature, and information for which access is restricted to one or more authorized persons.

* * * * *